United States Patent [19]

Buhler

[11] Patent Number: 5,214,859
[45] Date of Patent: Jun. 1, 1993

[54] SLED APPARATUS FOR TAPE MEASURE

[76] Inventor: Randy W. Buhler, 6606 Potomac Pkwy., Arlington, Tex. 76017

[21] Appl. No.: 935,025

[22] Filed: Aug. 25, 1992

[51] Int. Cl.⁵ .............................................. G01B 3/10
[52] U.S. Cl. ...................................... 33/770; 33/759
[58] Field of Search ............... 33/759, 768, 770, 757, 33/760

[56] References Cited

U.S. PATENT DOCUMENTS

| | | | |
|---|---|---|---|
| 3,745,663 | 7/1973 | Dodge | 33/759 |
| 4,300,289 | 11/1981 | DeHaven | 33/770 |

FOREIGN PATENT DOCUMENTS 2233097  1/1991  United Kingdom ................. 33/755

*Primary Examiner*—Thomas B. Will
*Attorney, Agent, or Firm*—Geoffrey A. Mantooth

[57] ABSTRACT

The leading end of a tape measure can be pushed over an uneven surface such as a shingled roof by coupling a sled or ski to the end of the tape. The sled has a smooth lower surface. A forward end of the sled is upraised so as to present a curved surface to obstacles. As the tape is pushed along the surface, the sled is pushed by the tape. The sled prevents the end of the tape from snagging on objects, by gliding over obstacles.

11 Claims, 1 Drawing Sheet

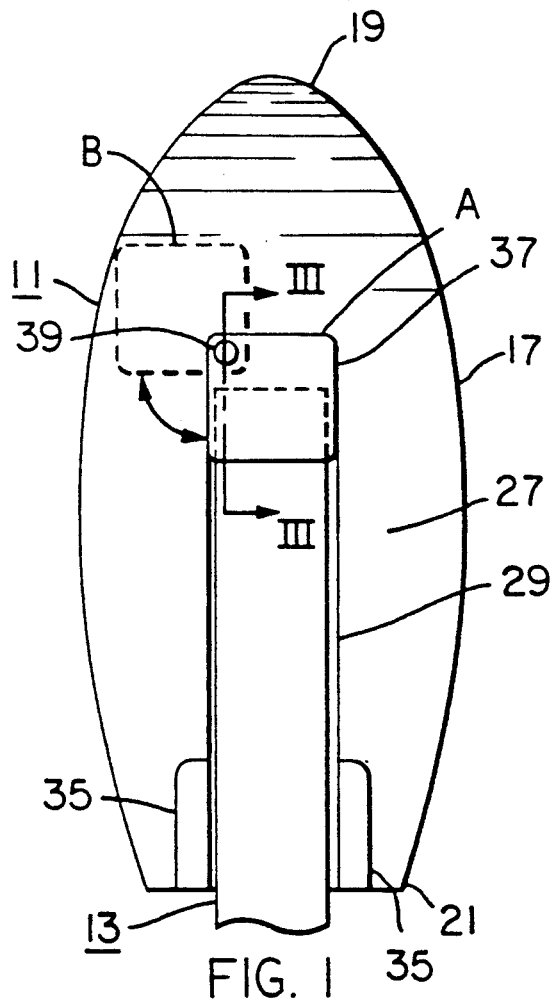
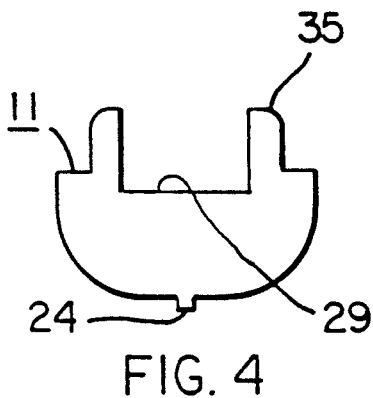
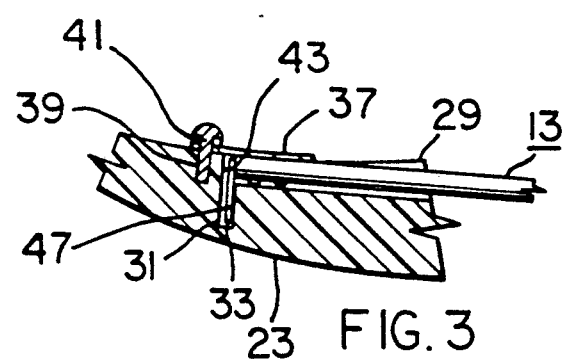
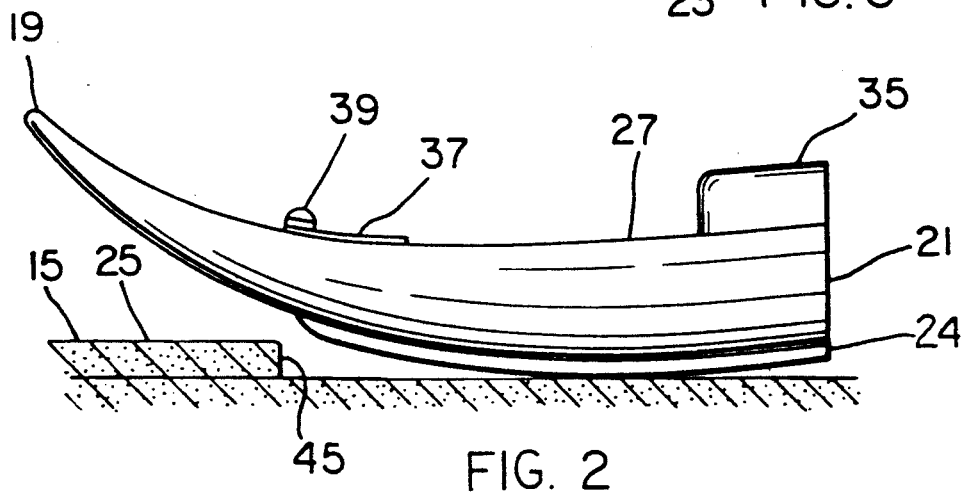

SLED APPARATUS FOR TAPE MEASURE

FIELD OF THE INVENTION

The present invention relates to apparatuses that are used in conjunction with tape measures.

BACKGROUND OF THE INVENTION

In the insurance and roofing industries, there is a frequent need to measure the roof on a house. For example, a hail storm may cause severe damage to a roof. In order to adjust the amount of compensation suitable to make repairs, the roof must be measured. Measurements are typically taken from the top ridge down to the edge of the roof.

After being damaged, many roofs are dangerous to climb up on to. Damaged shingles can give way under the weight of the adjuster, causing a potentially dangerous slip and fall off of the roof. In addition, many roofs are too steep to safely climb.

Thus, a preferred way of measuring the roof from the top ridge to the eaves is to stand at the edge of the roof and push a tape measure up to the top ridge. The adjuster can stand on the ground, or on a ladder. When the end of the tape reaches the top ridge of the roof, the adjuster takes the measurement from the edge of the roof.

The problem with measuring roofs in this manner is that it is difficult to push the tape measure up the courses of shingles. Each shingle has a thickness, which forms an edge around the shingle. When laid in courses on a roof, the lowermost edge is exposed. As the tape is being pushed up, the end of the tape must traverse this lowermost edge. Because the lowermost edge of the shingle is perpendicular to the direction of travel of the tape, the end of the tape frequently snags on this edge. This snagging makes it difficult and frustrating to push a tape up a roof. Many tapes have a metal lip on their ends. This lip also snags the lowermost end of the shingles.

SUMMARY OF THE INVENTION

It is therefore an object of the present invention to provide an apparatus and method for easing the end of a tape measure up a shingled roof.

The present invention includes first and second ends. An upper portion is located between the first and second ends, with the upper portion being adapted for receiving a portion of the tape. Means for securing the tape portion to the apparatus is provided. The securing means is located on the upper portion. The apparatus has a lower surface that extends between the first and second ends. The lower surface is smooth and arcuate such that the first end is located above the second end when the lower surface bears on a horizontal surface.

The method of the present invention is for pushing a tape over an uneven surface. The method provides that the end portion of the tape is exposed. A ski is coupled to the tape end portion. Then the tape is pushed over the surface such that a prow of the ski is in the leading position.

BRIEF DESCRIPTION OF THE DRAWINGS

FIG. 1 is a plan view of the tape sled of the present invention, shown in accordance with a preferred embodiment.

FIG. 2 is a side elevational view of the tape sled.

FIG. 3 is a cross-sectional view showing how the end of the tape is received by the sled, taken at lines III—III of FIG. 1.

FIG. 4 is an aft or rear end view of the sled.

DESCRIPTION OF THE PREFERRED EMBODIMENT

In the Figs., there is shown the tape sled 11 of the present invention, in accordance with a preferred embodiment. The tape sled is used in conjunction with the tape 13 of a conventional tape measure so as to ease the movement of the tape over an uneven surface, such as a roof 15.

The tape sled has a body 17 that has forward and aft ends 19, 21. The body 17 generally resembles a shortened ski (either snow or water ski) and has a smooth lower surface 23 to ease movement over shingles 25 and other obstructions. The lower surface 23 is bowed from the forward end 19 to the aft end 21. The forward end 19 of the body forms an uplifted prow, much like the forward tip of a ski. As shown in FIG. 2, the forward end 19 is located some distance above the aft end 21. The lower surface 23 near the aft end 21 is relatively flatter. A ridge 24 is provided on the lower surface 23, which ridge extends along the longitudinal axis of the sled. The ridge 24 extends from the aft end 21 toward the forward end. The front end of the ridge is tapered to avoid forming a blunt edge.

The tape sled has an upper surface 27. The upper surface 27 has a shallow groove 29 or channel that receives the tape. The groove 29 extends from the aft end 21 towards the forward end, where it terminates in a slot 31. The slot 31 is deeper than the groove 29 and extends the full width of the groove. The slot is defined by a forward wall 43 and an aft wall 47. The slot 31 receives a lip 33 on the end of the tape, as shown in FIG. 3.

Located at the aft end 21 of the sled are two projections 35 that project upwardly from the upper surface 27 of the sled. The projections 35 are spaced apart to straddle the channel 29. The channel 29 and the projections 35 prevent the tape 13 from moving laterally with respect to the sled.

A securing member 37 is provided on the upper surface 27 of the sled. The securing member 37 is formed by a wall and is pivotally coupled to the tape sled. The securing member 37 is coupled to the sled by a screw 39. A washer 41 is located between the securing member 37 and the head of the screw 39. The securing member 37 is tightly coupled to the sled by the screw so as to provide a somewhat large resistance to pivoting the securing member between open and closed positions. This resistance to movement prevents inadvertent movement of the securing member. In the closed position A, shown in solid lines in FIG. 1 and also shown in FIG. 3, the securing member 37 overlays the forward end of the channel 29 so as to secure the tape therein. In the open position B of the securing member 37, shown in dashed lines in FIG. 1, the forward end of the channel 29 is exposed to allow insertion and removal of the tape.

The tape sled 11 may be made of plastic, wood, metal or other suitable material. The mass of the sled is sufficiently small so that the tape can push the sled up a sloping roof.

The operation of the sled will now be described. The sled is coupled to the end of the tape 13 as follows. The securing member 37 is moved to the open position B to expose the channel 29. Then, the lip 33 of the tape 13 is located in the slot 31 and the tape 13 is located in the channel 29 so as to extend between the two projections 35 and beyond the aft end 21 of the sled. The securing member 37 is then moved to the closed position A, wherein the end of the tape 13 is interposed between the securing member and the bottom of the channel. The end of the tape is thus effectively secured to the sled.

The sled 11 is then oriented on the uneven surface such that the forward end 19 is in the same direction that the tape is to be pushed. The tape 13 is then pushed from some location along its length. As the tape is being pushed, the end of the tape pushes the sled 11 along with it. More specifically, the lip 33 bears on the forward wall 43 of the slot (see FIG. 3). The sled 11 presents a smooth bowed surface that is capable of easily surmounting obstacles such as the edge 45 of a shingle 25. Thus, any snagging of the end of the tape is prevented by the sled. As the tape pushes the sled along, the sled may tip slightly in the forward direction causing the forward end 19 to lower somewhat. The forward end 19 is bowed sufficiently such that even with such forward tipping, a curved surface is presented to obstacles so as to enable the easy traverse of said obstacles. The ridge 24 is narrow enough to fit through slots between composite shingles, thus further easing the pushing of the tape up a roof. The ridge 24 helps guide the sled up the roof.

Movement of the tape 13 from side to side relative to the direction of sled travel is prevented by the groove 29 and the projections 35 which act as a guide for confining the tape. The projections 35 are spaced apart from the securing member 37 so that the end of the tape is structurally reinforced by the sled. Thus, when the tape is being pushed from some location along its length that is distant from the sled, the pushing force is transmitted to the sled, producing forward movement of both the sled and the tape.

When a roof is measured, the measurer stands at the edge of the roof and pushes the tape and the sled up the roof to the roof top. The sled glides over the lowermost edges 45 of the shingles, easing the movement of the tape up the roof.

When the sled reaches the top of the roof, the measurement is obtained. The tape is then retrieved by merely pulling the tape back down the roof. When the tape is pulled back, the sled is also retrieved because the lip 33 bears on the aft wall 47 of the slot 31, pulling the sled along with the tape. Thus, the sled is pulled, aft end 21 first, back down the roof. The tape can be removed from the sled by moving the securing member 37 to the open position.

The foregoing disclosure and the showings made in the drawings are merely illustrative of the principles of this invention and are not to be interpreted in a limiting sense.

We claim:

1. An apparatus for use with a tape of a tape measure, comprising:
   a) first and second ends;
   b) an upper portion located between said first and second ends, said upper portion being adapted for receiving a portion of said tape;
   c) means for securing said tape portion to said apparatus when said apparatus is used with said tape, said securing means being located on said upper portion;
   d) a lower surface extending between said first and second ends, said lower surface being smooth and arcuate such that said first end is located above said second end when said lower surface bears on a horizontal surface.

2. The apparatus of claim 1 further comprising two projections extending from said upper portion near said second end, said projections being spaced apart from each other for forming a gap, said gap being adapted to receive said tape, wherein said projections confine said tape.

3. The apparatus of claim 1 further comprising a groove located in said upper portion, said groove extending from said securing means to said second end, said groove being adapted for receiving said tape portion.

4. The apparatus of claim 1 wherein said securing means is releasable so as to allow the removal of said tape portion from said apparatus.

5. The apparatus of claim 1 wherein said securing means comprises a slot located in said upper portion, said slot for receiving a lip on an end of said tape portion, said securing means also comprising a wall that covers said tape portion end when said lip is received by said slot, said wall being movable so as to uncover said tape portion end and allow the removal of said tape portion from said apparatus.

6. The apparatus of claim 1 wherein said securing means is located on said upper portion at a first location, said apparatus further comprising guide means for guiding and confining said tape when said apparatus is used with said tape, said guide means being located at a second location on said upper portion that is spaced apart from said first location.

7. An apparatus, comprising:
   a) a tape measure having a tape;
   b) a sled comprising:
      i) first and second ends;
      ii) an upper portion located between said first and second ends, said upper portion receiving a portion of said tape;
      iii) means for securing said tape portion to said apparatus, said securing means being located on said upper portion;
      iv) a lower surface extending between said first and second ends, said lower surface being smooth and arcuate such that said first end is located above said second end when said lower surface bears on a horizontal surface.

8. A method of pushing a tape end portion of a tape measure over an uneven surface, comprising the steps of:
   a) exposing said end portion of said tape;
   b) coupling a sled having a smooth and curved surface to said tape end portion;
   c) placing said sled smooth and curved surface in contact with said surface over which said tape end portion is to be pushed;
   d) pushing said sled and said tape end portion over said surface with said tape.

9. The method of claim 8 further comprising the step of uncoupling said tape end portion from said sled.

10. The method of claim 8 wherein said step of coupling said tape end portion to said sled comprises the step of preventing lateral movement of said tape end portion relative to said sled.

11. The method of claim 8 wherein said step of pushing said sled and said tape end portion comprises the step of pushing said sled and said tape end portion upwardly on a roof covered with shingles.

* * * * *